United States Patent [19]

Bishop et al.

[11] Patent Number: 4,840,197

[45] Date of Patent: Jun. 20, 1989

[54] POWER STEERING VALVE

[76] Inventors: Arthur E. Bishop; John Baxter, both of P. O. Box 217, Gladesville, 2111, Wales

[21] Appl. No.: 206,290

[22] Filed: Jun. 14, 1988

[30] Foreign Application Priority Data

Jun. 15, 1987 [AU] Australia .............................. P 12477

[51] Int. Cl.⁴ ............................................. F15B 13/14
[52] U.S. Cl. ............................. 137/625.21; 91/375 A
[58] Field of Search ...................... 137/625.21, 625.22, 137/625.23, 625.24; 91/375 A, 375 R

[56] References Cited

U.S. PATENT DOCUMENTS

| 4,194,531 | 3/1980 | Bishop | 137/625.24 X |
| 4,561,516 | 12/1985 | Bishop | 137/625.32 |

Primary Examiner—Alan Cohan
Attorney, Agent, or Firm—Hill, Van Santen, Steadman & Simpson

[57] ABSTRACT

A rotary hydraulic valve to control the hydraulic pressure in power steering gears for automotive vehicles, comprising:
  an input-shaft;
  a coaxially arranged driven member;
  a torsion bar drivingly connecting input-shaft and driven member, interengaging means connecting input-shaft and driven member arranged for limited lost motion between input-shaft and driven member;
  an axially movable sleeve surrounding input-shaft;
  an intermediate member carried between sleeve and driven member to provide a slack-free driving connection between sleeve and driven member;
  the intermediate member being in the form of a thin arcuately shaped member having arms extending partially around and embracing the driven member and outwardly and inwardly extending lugs respectively engaging and fitting closely within slots formed in the sleeve and the driven member, the lug fitting within the slot in the sleeve being constructed and arranged to permit axial movement of the sleeve.

2 Claims, 2 Drawing Sheets

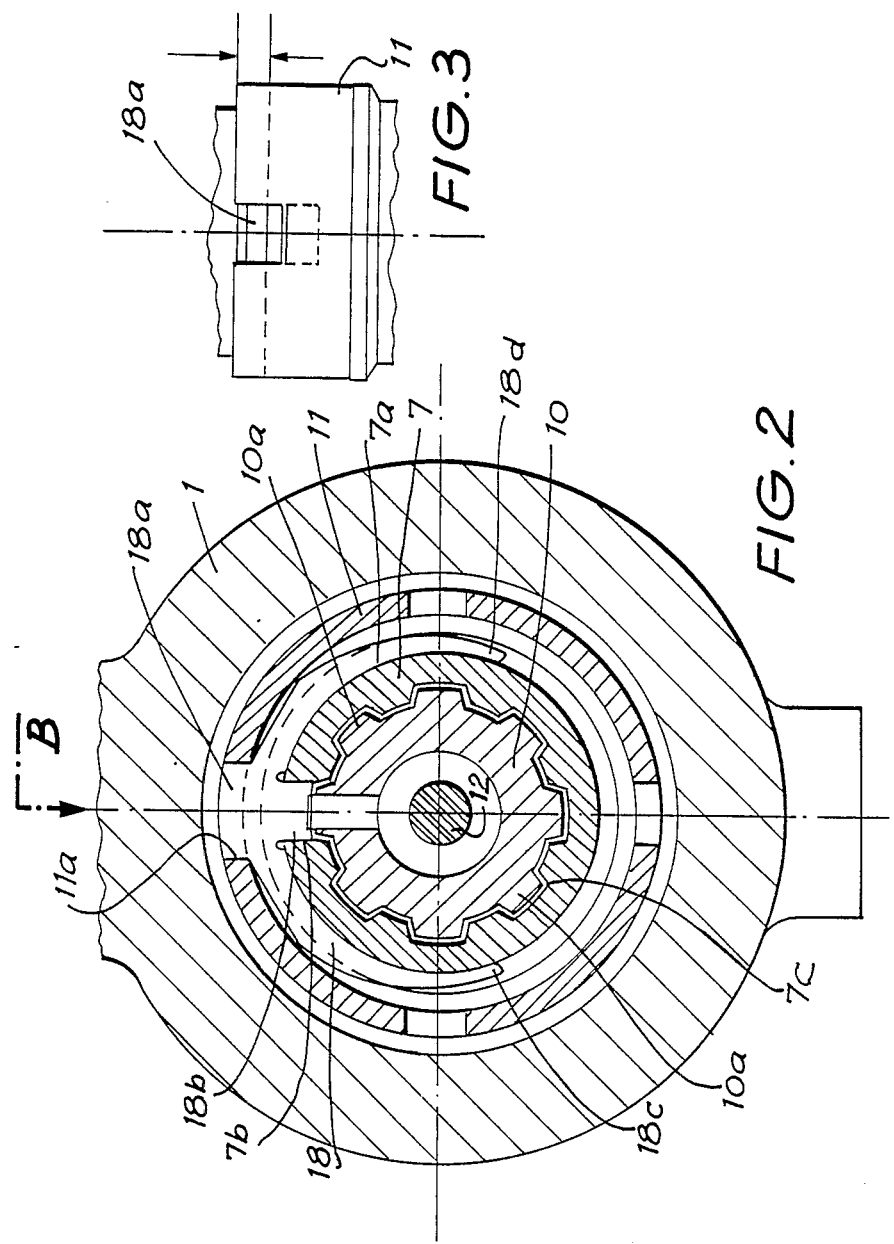

POWER STEERING VALVE

This invention relates to torsion-bar centred rotary hydraulic power steering valves for vehicles.

Conventionally, such a rotary valve employs an inner valve member, or input-shaft, and an outer hollow-cylindrical valve member, or sleeve. The input-shaft drives the first member of the reduction mechanism of the steering gear, henceforth called the driven member, via a torsion bar. The driven member of an integral type steering gear is generally a recirculating ball-screw or an hourglass worm. For rack and pinion steering gears, the driven member is the pinion. The sleeve, which encloses the input shaft, is arranged to be driven by the driven member in a slack-free manner usually by a pin projecting radially from the latter and engaging a slot or hole in the sleeve skirt. The application of a torque at the input-shaft by the driver is therefore accompanied by an angular deflection of the torsion bar connecting the input-shaft and driven member. This, in turn causes relative angular displacement between the input-shaft and sleeve away from their neutral, undeflected position, activating the rotary valve and hence the power assist.

Maximum power assist is generally achieved for an angular displacement of the input-shaft and sleeve of about 3.5 degrees. According to accepted manufacturing practice, the angular deflection of the torsion bar to achieve maximum power assist pressure either way from the neutral position must be equal within 5–10 minutes of arc to assure satisfactory "trim", or symmetry of power steering valve operation.

A new type of rotary hydraulic power steering valve is disclosed in U.S. Pat. No. 4,561,516 in which the boost characteristic of the valve can be modulated as a function of vehicle speed or other parameters. This modulation is accomplished by axially displacing the sleeve along the input-shaft which it encloses, thereby masking off portions of the input-shaft metering edges which normally interact with the sleeve metering edges to produce a given valve boost characteristic. The axial displacement of the sleeve is facilitated via a slot in the sleeve skirt which slidably engages the earlier mentioned drive-pin on the driven member. The intention was that, independent of axial position of the sleeve on the input-shaft slack-free rotational engagement would occur between the driven member and sleeve, thus ensuring that the satisfactory trim tolerance earlier referred to is still maintained throughout the practical life of the steering gear. It has been found, however, that significant wear occurs on the circular-section drive-pin as disclosed in U.S. Pat. No. 4,561,516 due to the fact that only line contact exists between the drive-pin and engaging slot on the sleeve skirt. This line contact would not normally present a problem in valves not involving axial sleeve displacement since minimal wear would result, however, this phenomenon has proven to be a major problem in said new power steering valve configuration.

In theory at least, the line contact problem on sleeve drive-pins could be eliminated by generating flats on the drive-pin parallel with the bore of the sleeve. In order to ensure this parallelism, and thus maintain satisfactory valve trim for different axial sleeve positions, it would be necessary to grind these flats in situ. That is, the flats would be ground after the drive-pin had been pressed into the outer diameter of the driven member. Such a methodology, however, is extremely undesirable from a manufacturing viewpoint. It is difficult, and hence costly, to "re-setup" a part after partial assembly. Moreover, not only would a high degree of parallelism have to be maintained on the flats, but also the dimension across the flats would have to be held, within a few microns, equal to the width of the corresponding slot on the sleeve skirt in order that this sleeve drive connection shall be relatively slack-free.

A much more viable solution to the problem of providing a slack-free connection between driven member and sleeve, and at the same time maintaining essentially surface contact between mutually sliding components, is the replacement of the conventional drive-pin system with what would be best described as a "drive-circlip" system. A sleeve drive-circlip system has been previously proposed in U.S. Pat. 4,194,531, as an element of a "fail-safe" drive and trimming system for power steering valves. All torsion-bar centred rotary hydraulic power steering valves require such a fail-safe drive to ensure that at least the mechanical drive of the steering gear is not lost in the advent of a torsion-bar breaking or the pinning system at either end of the torsion-bar becoming dislodged. The fail-safe drive system disclosed in U.S. Pat. No. 4,194,531 involves three mutually interengaging lugs on input-shaft and driven member which are sufficiently underlapped to permit the angular rotation of the two components necessary for normal power steering valve operation. The three lugs on the driven member are shaped so that a fully enclosed sleeve drive-circlip can be clipped onto the tapered slot formed by the adjacent faces of two lugs and be locked into position on the outside diameter of the third lug by friction. A system is also provided which enables the rotational position of the drive-circlip to be finely adjusted during the valve trimming operation.

As implied, however, this type of drive-circlip relies for its operation on said unique fail-safe drive configuration, and cannot be used in association with the most widely accepted form of fail-safe drive system. The latter system consists of a male spline on the input-shaft meshing in an underlap relationship with a female spline on the driven member. Thus the driven member "lugs" are contained internally within the driven member and are therefore not accessible for attachment of the sleeve drive-circlip. Another functional disadvantage of the drive-circlip system disclosed in U.S. Pat. No. 4,194,531 is that the drive-circlip is not locked positively, rather by friction. This is necessitated by the high resolution of adjustment required by the trimming operation.

The present invention offers a sleeve drive-circlip system which, while ensuring accurate and parallel surface contact between driven-member and sleeve, is completely compatible with said widely accepted sleeve fail-safe drive system. Moreover, since the proposed system is purely intended for sleeve drive, rather than the additional function of trimming, the drive-circlip can be locked positively.

The present invention consists of a rotary hydraulic valve to control the hydraulic pressure in power steering gears for automotive vehicles, comprising:
 an input-shaft;
 a coaxially arranged driven member;
 a torsion bar drivingly connecting said input-shaft and said driven member, interengaging means connecting said input-shaft and said driven member arranged for limited lost motion between said input-shaft and driven member;

an axially movable sleeve surrounding said input-shaft;

an intermediate member carried between said sleeve and said driven member to provide a slack-free driving connection between said sleeve and said driven member;

the said intermediate member being in the form of a thin arcuately shaped member having arms extending partially around and embracing the driven member and outwardly and inwardly extending lugs respectively engaging and fitting closely within slots formed in the sleeve and the driven member, the lug fitting within the slot in the sleeve being constructed and arranged to permit axial movement of the sleeve.

A preferred embodiment of the invention is hereinafter described by way of example, with reference to the accompanying drawings, in which:

FIG. 2 is a section through AA of FIG. 1;

FIG. 3 is a scrap view in direction B of FIG. 2.

Figure 1:
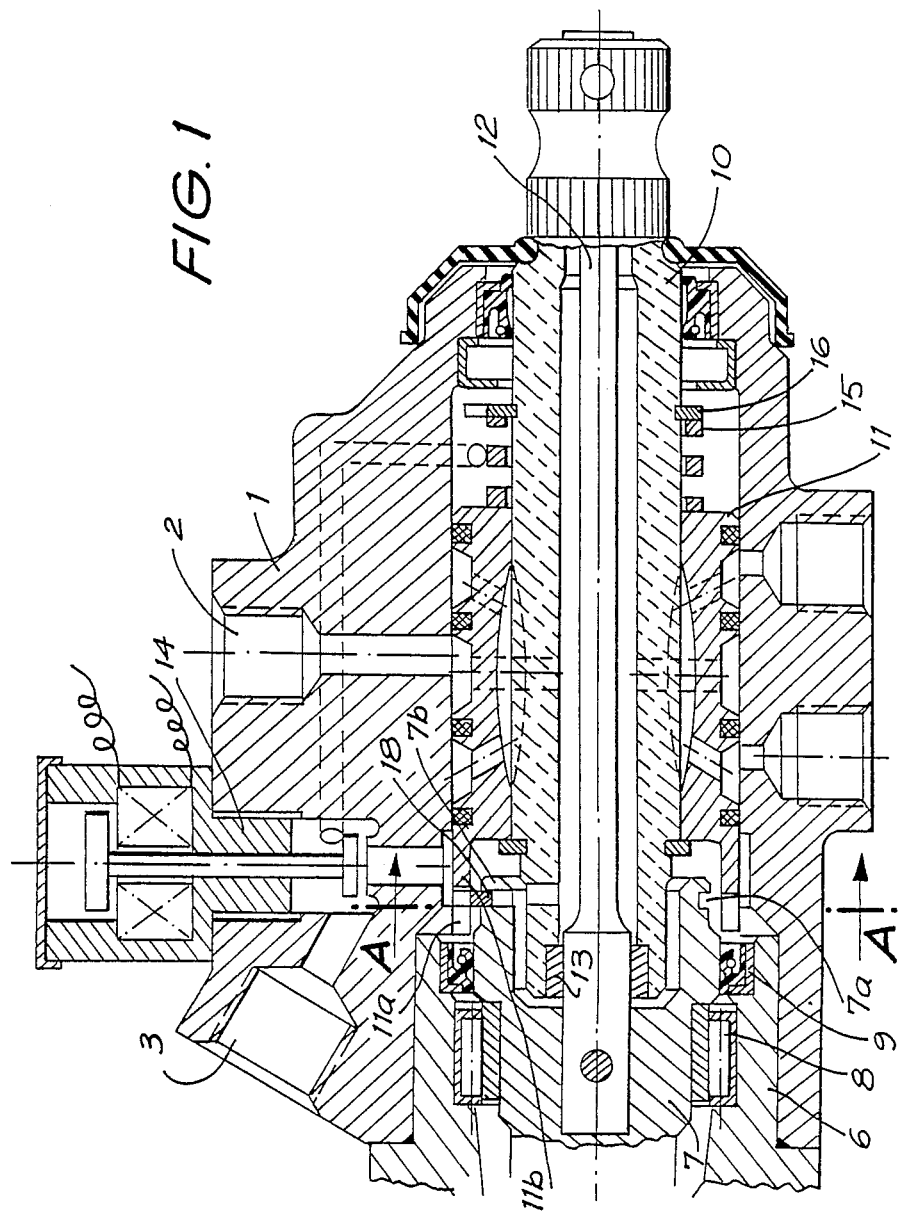
FIG. 1 is a section through a typical power steering valve employing the invention.

Referring to FIG. 1, valve housing 1 is provided with pump inlet and return connections 2 and 3 respectivly and right and left hand cylinder connections 4 and 5.

Steering gear housing 6, to which valve housing 1 is attached, contains the mechanical steering elements, FIG. 1 shows a portion of pinion 7, the driven-element in this case, journalled by needle-roller bearing 8 and provided with seal 9.

The three main power steering valve elements comprise input-shaft 10, sleeve 11 journalled thereon, and torsion bar 12. This torsion bar is secured by a pin to the input-shaft at one end and similarly to pinion 7 at the other. It also provides a journal for input-shaft 10 by way of a bush as at 13.

Consistent with the art previously referred to in U.S. Pat. No. 4,561,516, sleeve 11 is able to axially displace along input-shaft 10 under the influence of back-pressure applied by solenoid valve 14 acting on its annular cross-sectional area. The relevant axial force acting on sleeve 11 is reacted by the resulting compression generated in spring 15, in turn abutted against input-shaft 10 via circlip 16. The details of the hydraulic operation of this power steering valve is fully detailed in U.S. Pat. No. 4,561,516 and will not be further described here.

The input shaft is formed with splines 10a which are a loose fit in grooves 7c formed in the interior of a bore in the pinion thus providing a limited lost motion connection between the input shaft and the driven member pinion.

Sleeve drive-circlip 18, the intermediate member connecting sleeve 11 and driven member 7, is manufactured from 2-3 mm steel plate via a fine-blanking operation. As seen in FIG. 2, it is basically arcuate in shape and comprises arms 18c and 18d which extend partially around driven member 7 and axially restrained by their location in circumferential groove 7a, machined in the outside periphery thereof. Inwardly extending lug 18b is designed to be an interference press-fit into slot 7b in driven member 7, this slot being milled prior to the driven-member hardening operation. The action of arms 18c and 18d, and inwardly extending lug 18b, is to positively lock sleeve drive-circlip 18 onto driven member 7.

Outwardly extending lug 18a is designed to be an essentially slack-free sliding fit in slot 11a, formed in the end of skirt 11b of sleeve 11. The subsequent accuracy tolerance required on the width of this latter slot would necessitate it being milled prior to the sleeve hardening operation and subsequenty finish-ground. The sliding fit generated between lug 18a and sleeve slot 11a permits sleeve 11 to axially displace along input shaft 10, as necessitated by the invention disclosed in U.S. Pat. No. 4,561,516. The accuracy and parallelism of the two contacting surfaces on lug 18a and slot 11a, a result of the fine blanking and the finish grinding operations on sleeve drive-circlip 18 and sleeve 11 respectively, ensure that true surface contact is maintained, irrespective of the axial displaced position of the sleeve. A typical contact area on each of the two sides of lug 18a is approximately 4 sq mm.

An added benefit of the sleeve drive-circlip system is that circlip arms 18c and 18d are fully enclosed by the sleeve skirt at all times. Hence, any unexpected slackening of the specified interference press-fit between inwardly extending lug 18b and slot 7b in the driven member cannot result in the circlip being totally dislodged. A loss of positive drive between driven member and sleeve could significantly bias the power steering valve and result in erratic or even dangerous steering gear operation.

The claims defining the invention are as follows:

1. A rotary hydraulic valve to control the hydraulic pressure in power steering gears for automotive vehicles, comprising:

an input-shaft;

a coaxially arranged driven member;

a torsion bar drivingly connecting said input-shaft and said driven member, interengaging means connecting said input-shaft and said driven member arranged for limited lost motion between said input-shaft and driven member;

an axially movable sleeve surrounding said input-shaft;

an intermediate member carried between said sleeve and said driven member to provide a slack-free driving connection between said sleeve and said driven member;

the said intermediate member being in the form of a thin arcuately shaped member having arms extending partially around and embracing the driven member and outwardly and inwardly extending lugs respectively engaging and fitting closely within slots formed in the sleeve and the driven member, the lug fitting within the slot in the sleeve being constructed and arranged to permit axial movement of the sleeve.

2. A rotary hydraulic valve as claimed in claim 1 wherein the arms of the intermediate member fit closely within a circumferential groove formed on the driven member.

* * * * *